United States Patent Office 2,729,631
Patented Jan. 3, 1956

2,729,631
VAT DYESTUFF OF THE ANTHRAQUINONE-ACRIDONE SERIES

Paul Nawiasky, Summit, N. J., and L. D. Barrick, Pittsburgh, Pa., assignors to General Aniline & Film Corporation, New York, N. Y., a corporation of Delaware No Drawing. Application May 21, 1952,
Serial No. 289,207

1 Claim. (Cl. 260—155)

The present invention relates to a novel dyestuff of the anthraquinone-acridone series.

We have found that the novel vat dyestuff obtained by condensing two moles of 4-aminoanthraquinone-2-1-benzacridone with one mole of azodiphenyl-p,p'-dicarboxylic acid chloride has many desirable properties. The thus obtained vat dyestuff, when dyed or printed on vegetable fibers by the usual vat dyeing or printing techniques, gives a desirable, rather unique shade of yellowish-green. The thus obtained dyeings are characterized by very good fastness to chlorine and other properties.

The novel dyestuff of the present invention and its method of preparation is illustrated graphically in the following equation:

The detailed preparation of this novel dyestuff will be apparent to those skilled in the art from a consideration of the following specific example:

Example 68 parts (0.2 mole) of 4-amino-anthraquinone-2,1-benzacridone were charged into a solution of 42.2 parts (0.1 mole) of azo-diphenyl 4,4'-dicarbonyl chloride and 30 parts of pyridine in 1000 parts of dichlorobenzene at 110–115° C. The reaction mixture was stirred at 110–115° C. until condensation was complete, as shown by the absence of green coloration of a test sample in boric acid-acetic anhydride solution. The mixture was then allowed to cool to 25° C. and the insoluble condensation products washed with alcohol and dried. The product, which has the formula

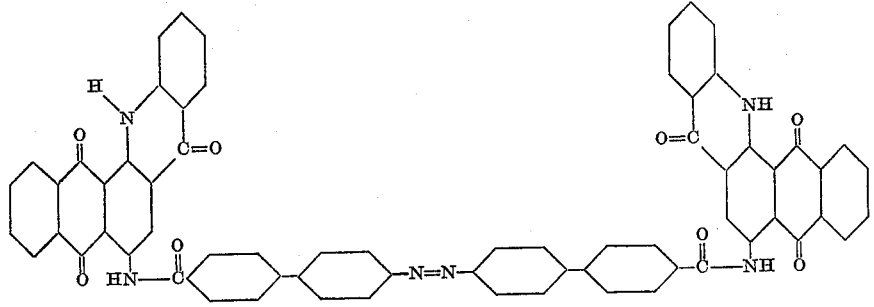

was a green powder which was acid pasted from cold concentrated sulfuric acid and made into a water paste suitable for printing and dyeing. It dyed and printed cotton a yellowish-green shade.

The present application is a continuation-in-part of our copending application Serial No. 617,673, filed September 20, 1945 (now abandoned).

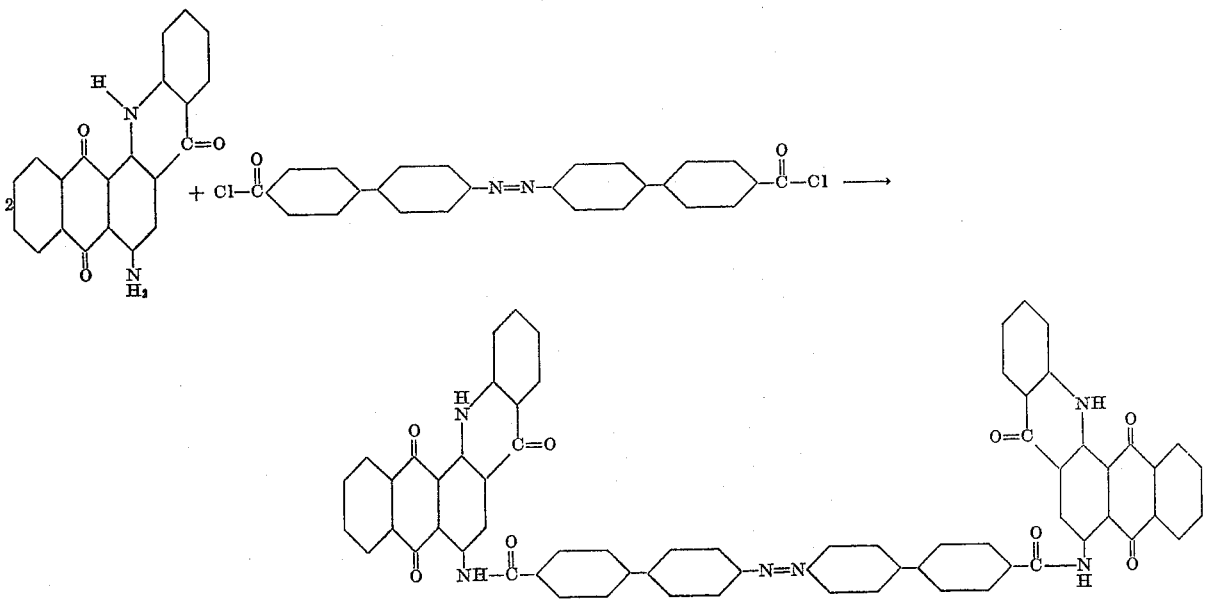

We claim:
The vat dyestuff of the formula:
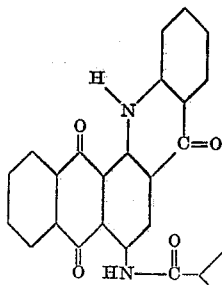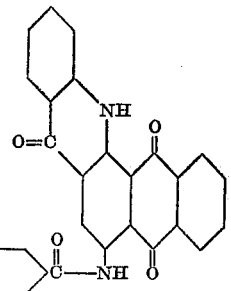
References Cited in the file of this patent
UNITED STATES PATENTS
| | | |
|---|---|---|
| 2,156,731 | Lange et al. | May 2, 1939 |
| 2,228,455 | Honold et al. | Jan. 14, 1941 |
| 2,235,480 | Graenacher et al. | Mar. 18, 1941 |
| 2,568,966 | Morgeli et al. | Sept. 25, 1951 |